Patented Aug. 11, 1953

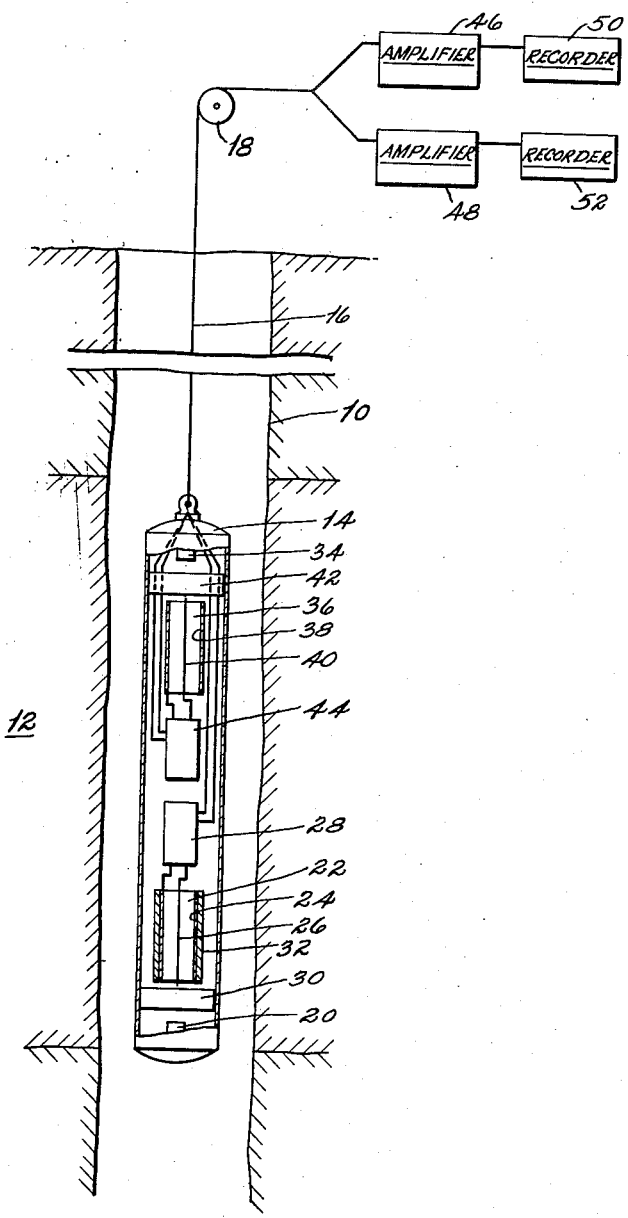

2,648,780

UNITED STATES PATENT OFFICE 2,648,780

COMBINATION INDUCED AND SCATTERED GAMMA RAY BOREHOLE LOGGING

Gerhard Herzog, Houston, Tex., assignor to The Texas Company, New York, N. Y., a corporation of Delaware Application June 15, 1950, Serial No. 168,316

1 Claim. (Cl. 250—83.6)

This invention relates to the logging of wells or bore holes by radioactivity measurement, and more particularly, to a method and apparatus by means of which two separate and distinct logs are made simultaneously, one of these being an induced gamma ray log and the other being a scattered gamma ray log. The principal object of the invention is the provision of such a method and apparatus through the use of which these two different logs can be made in a minimum of time and with the passage of a single logging instrument through the well or bore hole without interference between the two logs, i. e. the two effects to be measured.

In the logging of a bore hole to obtain information as to the nature and characteristics of the subsurface formations traversed by the hole, such, for example, as the porosity of the formations, a source of neutrons and a gamma ray detector mounted within a suitable housing are passed through the hole, the detector measuring gamma rays which are induced in the formations due to the bombardment thereof by neutrons from the source. This is frequently called an induced gamma ray log or a neutron-gamma ray log. It is also possible to obtain additional information as to the nature of the subsurface formations by passing through the hole a housing containing a source of gamma rays and a gamma ray detector, the detector measuring gamma rays which originate in the source and which penetrate and are scattered within the surrounding formations, some of these scattered gamma rays returning to the hole where they strike the detector. In the past it has been necessary to make these two logs separately and this has entailed the lowering and raising of an instrument through the hole to make the neutron-gamma ray log and subsequently the passage of another instrument through the hole to make the scattered gamma ray or gamma-gamma log. The making of any radioactivity log of a bore hole takes considerable time since the instrument is usually passed through the hole during the logging operation at the rate of from about 1,000 to 5,000 or 6,000 feet per hour. With the present invention the two logs can be made simultaneously, thus saving about half of the time previously required. Another important feature of the invention resides in the fact that with the arrangement to be described, the two logging measurements are always made at the same positions with respect to each other, whereas where two separate logs are run at different times the true depths of the logging instruments may vary from those indicated at the surface due to different amounts of stretching in the cable, etc.

In accordance with the invention, a source of neutrons which may or may not also emit gamma rays, is disposed at one end of an elongated sealed instrument housing and a gamma ray detector is also disposed within the housing fairly close to the neutron source. If the neutron source is of the type which also emits gamma rays such, for example, as a mixture of radium and beryllium, provisions may be taken for preventing the gamma rays from the neutron source and which are scattered in the surrounding material from striking the induced gamma ray detector to produce spurious indications. Thus, as is disclosed in my co-pending application Serial No. 168,315 filed concurrently herewith, the induced gamma ray detector may be surrounded at its sides with a layer of gamma ray absorbing material such as lead, to absorb a large portion of the unwanted scattered gamma rays which would otherwise strike the detector. It is preferred that the detector be of the electrical pulse-producing or counter type and as is disclosed in the above mentioned application, the cathode of the detector may be formed of a metal of low atomic number such as brass, copper or aluminum which is preferentially sensitive to the induced gamma rays. Also disposed in the instrument housing and at the other end thereof, is a source of gamma rays such as radium, radioactive cobalt, or any other suitable gamma ray emitting substance. Disposed in the near vicinity of the gamma ray source is another gamma ray detector which is responsive to the gamma rays from the source which are scattered in the surrounding formations and some of which return to the hole to strike the detector. In this case, also, the detector is preferably of the electrical pulse-producing type and is unshielded. The cathode of this detector is preferably formed of one of the high atomic number metals such as lead, tantalum, bismuth or the like which is preferentially sensitive to the low energy scattered gamma rays, rather than to the higher energy induced gamma rays. Although conventional Geiger-Mueller counters may be used as the detectors, it is preferred that they be of the high efficiency type disclosed in the U. S. Letters Patent No. 2,397,071 granted March 19, 1946, to D. G. C. Hare. The instrument housing also contains means for preamplifying the outputs of the detectors and for transmitting these preamplified outputs to the surface over the conductor cable from which the instrument is suspended. At the surface the detector responses are again amplified and two records are made, one of the output of the induced gamma ray detector, and the other of the output of the scattered gamma ray detector. In order that there be no interference between the two effects being measured, the induced gamma ray detector should be separated from the gamma ray source by a distance sufficient that all or substantially all of the gamma rays from that source will be absorbed before they can reach the induced gamma ray detector. For the same reason the scattered gamma ray detector should be separated from the neutron source (assuming that the neutron source also emits gamma rays) by a similar distance. Experiments have found that where this separation is six feet or more, there is substantially no interference.

For a better understanding of the invention, reference may be had to the accompanying drawing in which the single figure is a vertical sectional elevation through a bore hole showing an instrument suspended therein for making the combination log.

Referring to the drawing, a bore hole 10 is shown as traversing several subsurface formations such as that indicated at 12. Within the bore hole is an elongated instrument housing 14 suspended from the surface by means of the conductor cable 16 which passes over a suitable cable measuring device 18 for indicating the depth of the instrument in the hole. Within the housing 14 and substantially at the lower end thereof, is a source of neutrons 20 which may comprise a mixture of radium and beryllium. Disposed above the source 20 is a gamma ray detector 22 of the electrical pulse-producing type such as a conventional Geiger-Mueller counter or the high efficiency counter disclosed in the aforementioned Hare Patent No. 2,397,071. This detector is shown as comprising a cylindrical cathode member 24 with an anode wire 26 disposed along its longitudinal axis. The cathode 24 and anode 26 are, of course, mounted within a casing or shell (not shown) containing a suitable gas. The cathode and the anode are connected to a preamplifier 28, the output of which passes to the cable 16 and upwardly to the surface. Between the source 20 and the detector 22 is a layer 30 of gamma ray absorbing material such as lead, the purpose of which is to absorb gamma rays which would otherwise pass from the source 20 directly to the detector. The detector 22 is surrounded at its sides by a layer 32 of gamma ray absorbing material such as lead ¼ to ⅜ inch in thickness which serves to absorb a large portion of the gamma rays emitted by the source 22 and which are scattered in the surrounding material back toward the detector. As is disclosed in the aforementioned Herzog application Serial No. 168,315 it is preferred that the cathode 24 be formed of, or contain, a low atomic number metal such as brass, copper, aluminum or the like which is preferentially sensitive to the high energy gamma rays induced in the formation by the neutron bombardment, rather than to the low energy scattered gamma rays.

Disposed within the other end of the housing 14 is a gamma ray source 34 which may be radium or an artificially radioactive substance such as radioactive cobalt. Below the source 34 is a gamma ray detector 36 also of the electrical pulse-producing type and which, like the detector 22, may be a conventional Geiger-Mueller counter or a high efficiency counter of the type disclosed in the aforementioned Hare patent. This detector is shown as comprising a cylindrical cathode 38 and an anode wire 40 disposed along its longitudinal axis. Between the source 34 and the detector 36 is a layer 42 of gamma ray absorbing material such as lead, the purpose of which is to prevent direct gamma rays from the source from striking the detector. The cathode 38 and anode 40 are connected to a suitable preamplifier 44, the output of which is conducted to the cable 16 and thence upwardly to the surface. It is preferred that the cathode 38 be formed of or contain a high atomic number metal such as lead, tantalum, bismuth or the like which is preferentially sensitive for the detection of the low energy gamma rays emitted from the source 34 and scattered within the surrounding formation back to the detector.

The cable 16 may contain several electrical conductors for conducting to the surface the outputs of the preamplifiers 28 and 44. At the surface the cable is connected to a pair of amplifiers 46 and 48 which are connected in turn to recorders 50 and 52.

In operation, while the instrument 14 is being passed through the hole 10 either in a downward or upward direction, as desired, neutrons from the source 20 penetrate the surrounding formations and, depending upon the nature of those formations, gamma rays may be induced therein, some of which pass backwardly toward the hole to strike the detector 22. Due to the provision of the shield 32 and the cathode 24 formed of a low atomic number metal, very few, if any, scattered gamma rays from the source 22 will be registered by the detector, as has been explained above. The output of the preamplifier 28 is further amplified by the amplifier 46 at the surface and passed to the recorder 50 which records the variations in the response of the detector 22, preferably in correlation with the indications of the depth of the instrument 14 in the hole. The record or log thus obtained may be used in determining the nature of the formations traversed by the hole.

Simultaneously with the making of the neutron-gamma ray log described in the foregoing paragraph, a scattered gamma ray log is made. Thus, the gamma rays from the source 34 penetrate the surrounding formations in which they are scattered and diffused, some returning to the hole to strike the detector 36. The response of this detector is preamplified at 44 and led to the surface where it is further amplified by means of the amplifier 48, the output of which passes to the recorder 52. The two detectors 22 and 36 will also respond to gamma rays naturally emitted by the formations, but their effect can be neglected if the sources 20 and 34 are made reasonably strong.

As has already been stated, it has been found experimentally that where the distance between the source 34 and the detector 22 and the distance between the source 20 and the detector 36 is six feet or more, the gamma rays from the source 34 will be absorbed before they can reach the detector 22 and likewise the gamma rays from the neutron-gamma ray source 20 will be absorbed before they can reach the detector 36. Thus there will be substantially no interference between the two effects being measured. The separation between the sources and the detectors can be taken into consideration when the logs are studied or one log can be displaced longitudinally with respect to the other log so that formational changes will appear opposite each other on the two logs, if desired.

Although a multi-counter cable 16 has been described, it is contemplated that the preamplified detector outputs may be conducted to the surface over a single conductor cable and that the single conductor of the cable may also conduct downwardly to the instrument 14 the electrical energy necessary for the operation of the detector and other elements.

It will be observed that with the invention which has been described, two separate logs may be made simultaneously in a bore hole, each log serving to provide information as to the character and nature of the subsurface formations without interference between the two logs and in about half the time it would normally take to make the two logs separately.

Obviously many other modifications and variations of the invention, as hereinbefore set forth, may be made without departing from the spirit and scope thereof, but only such limitations should be imposed as are indicated in the appended claim.

I claim:

A radioactivity bore hole logging assembly comprising an elongated instrument housing adapted to be passed through the hole suspended from a conductor cable, a source of neutrons and gamma rays disposed near one end of said housing, an induced gamma ray detector disposed within said housing near said source, said detector being of the electrical pulse-producing type and comprising a cathode and an anode and said cathode being formed of a low atomic number metal preferentially sensitive to the detection of gamma rays having energies of around 2.2 m. e. v., a direct gamma ray shield between said source and said detector, a layer of gamma ray absorbing material disposed around the sides of said detector for absorbing gamma rays from said source which are scattered in the surrounding material and returned toward the detector, a gamma ray source near the other end of said housing and separated from said first mentioned source by at least six feet, a scattered gamma ray detector of the electrical pulse-producing type disposed within said housing near said gamma ray source, said last mentioned detector comprising a cathode and an anode and said cathode being formed of a high atomic number metal preferentially sensitive to the detection of gamma rays having energies of ½ m. e. v., or less, a direct gamma ray shield between said gamma ray source and said scattered gamma ray detector and means for amplifying and recording the outputs of the two detectors, the simultaneous outputs of the two detectors being indicative of strata separated as to depth in the hole by a constant fixed distance.

GERHARD HERZOG.

References Cited in the file of this patent

UNITED STATES PATENTS

| Number | Name | Date |
|---|---|---|
| 2,296,176 | Neufeld | Sept. 15, 1942 |
| 2,469,463 | Russell | May 10, 1949 |
| 2,475,137 | Herzog | July 5, 1949 |
| 2,508,772 | Pontecorvo | May 23, 1950 |

OTHER REFERENCES

Some Practical Aspects of Radioactivity Well Logging, Jackson et al.—A. I. M. M. E. Technical Publication #1923, February 1945, publ. by AIMME 29 W. 39th St., N. Y. C. pages 1–27.